(12) United States Patent
Katsuta et al.

(10) Patent No.: US 7,701,664 B2
(45) Date of Patent: Apr. 20, 2010

(54) MOUNTING SPINDLE SHAFT IN MAGNETIC DISK DRIVE

(75) Inventors: Atsushi Katsuta, Kanagawa (JP); Josei Shimizu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1129 days.

(21) Appl. No.: 11/286,235

(22) Filed: Nov. 23, 2005

(65) Prior Publication Data

US 2006/0132965 A1 Jun. 22, 2006

(30) Foreign Application Priority Data

Dec. 20, 2004 (JP) ............... 2004-367386

(51) Int. Cl.
*G11B 25/04* (2006.01)
*H02K 7/08* (2006.01)
(52) U.S. Cl. ................... 360/99.08; 310/67 R
(58) Field of Classification Search .......... 360/99.08; 310/67 R, 90
See application file for complete search history.

(56) References Cited

U.S. PATENT DOCUMENTS 5,559,382 A * 9/1996 Oku et al. ............. 310/90
5,744,882 A * 4/1998 Teshima et al. .......... 310/67 R
6,466,400 B1 * 10/2002 Iwahara et al. .......... 360/99.08
6,924,962 B2 * 8/2005 Jeong .................. 360/265.6

FOREIGN PATENT DOCUMENTS

JP 10-125053 5/1998
JP 2001-202682 7/2001

* cited by examiner

*Primary Examiner*—Brian E Miller
(74) *Attorney, Agent, or Firm*—Townsend and Townsend and Crew LLP; John Henkhaus

(57) ABSTRACT

A magnetic disk drive has a problem in that when a shock in excess of a force used to fasten a spindle shaft to a cover is applied, the spindle shaft becomes inclined. Embodiments of the invention overcome this problem. In one embodiment, a cover is formed with a recessed portion at a location opposite to a spindle shaft. The recessed portion is formed with a projection having an end to be in contact with an inclined portion of a tapped hole of the spindle shaft. Thus, a "plug-like" structure is formed. Preferably, a gap between the cover and the spindle shaft is not present. With this structure, even if the shock is applied from outside, the projection of the cover acts as a stopper to suppress a displacement between the spindle shaft and the cover, thus preventing inclination of the spindle shaft.

6 Claims, 4 Drawing Sheets

MOUNTING SPINDLE SHAFT IN MAGNETIC DISK DRIVE

CROSS-REFERENCES TO RELATED APPLICATIONS

This application claims priority from Japanese Patent Application No. JP2004-367386, filed Dec. 20, 2004, the entire disclosure of which is incorporated herein by reference.

BACKGROUND OF THE INVENTION

The present invention relates to a magnetic disk drive, and more particularly to fixing construction of a spindle shaft for supporting a magnetic disk.

The magnetic disk drive includes a spindle motor for drivingly rotating a magnetic disk and a carriage for supporting a magnetic head that are mounted within a case composed of a base and a cover. The magnetic head is placed in a radial position over the magnetic disk by the carriage to write and read data thereto and therefrom.

A demand for the magnetic disk drives has increased and those applications expand from personal computers (PC) used in offices to laptop computers, portable equipment, vehicle-mounted car navigation systems and other outdoor devices. As a result, the use environment has become severe for the magnetic disk drives.

On the other hand, high-density recording and high-speed data transfer have been promoted, which require magnetic heads to have a higher degree of positional accuracy. It is essential to improve not only the reliability of mechanical systems under the usage environment conditions of drives but also the accuracy of components thereof. Further, even upon high-impact on a device, it is desired that a smaller effect be exerted on the various parts of the drive, and that the amount of displacement with several microns or so be not caused. In particular, it is desired for the shock not to produce a displacement of the magnetic disk, and a relative displacement between the magnetic disk and the magnetic head.

FIG. 6 shows the conventional fixing construction of a spindle shaft described in, e.g., Patent Document 1 (Japanese Patent Laid-open No. 10-125053). In this construction, the upper and lower portions of a spindle shaft 4 are screwed to a cover 2 and a base (not shown), respectively. Specifically, the base side end of the spindle shaft is fixed to the base with a plurality of screws, and the cover side end is fixed to the cover 2 with a single screw 16. Patent Document 2 (Japanese Patent Laid-open No. 2001-202682) discloses another conventional fixing construction in which first and second metal washers 27, 28 are fastened to a spindle shaft 4 with a screw 16 so that vibrations may be reduced which are caused by the rotation of a spindle motor and transmitted to a cover 2. Specifically, the cover 2 is formed with a hole at a position corresponding to the spindle shaft 4, the first metal washer 27 is placed on the cover in the periphery of the hole, and the second metal washer 28 is used to sandwich the cover 2 in the periphery of the hole in combination with the first metal washer 27.

BRIEF SUMMARY OF THE INVENTION

In the conventional magnetic disk drives, the spindle shaft and the cover are directly fastened to each other with the screw. Alternatively, the cover is put between the upper and lower washers, and the washers and the spindle shaft are fastened to each other with the screw. However, these pose a problem in that since there is a gap between the screw and the cover, when the shock in excess of the fastening force of the screw and the fastening force caused by a frictional force is applied from the outside, the fastening force is lost so that the spindle shaft becomes inclined.

The effect was examined by actually applying shocks to magnetic disk drives. The start/stop of rotation of the spindle motor was repeated several times to confirm it operates properly, then the performance is measured, and the presence or absence of the defect of the magnetic disk surface was examined. As a result, the start sequence of the magnetic disk drive is not properly terminated in many cases. Examination of the cause was made as to whether a displacement of the disk might occur, whether a failure of parts might occur, and whether any damage to electric parts might occur. As a result of examination, it was found that the spindle shaft has fallen. The cause as to why the spindle shaft falls is that a slide occurs in the fastening surface between the spindle shaft on the cover side and the cover.

When the spindle shaft has fallen, variations in flying height of the magnetic head and deterioration in positional accuracy degrade read/write characteristics. Accordingly, to solve this problem, the construction is required in which a displacement is not physically produced in the fastening surface between the spindle shaft and the cover.

A feature of the present invention is to provide a magnetic disk drive having a spindle shaft that is not inclined due to shock from outside.

A magnetic disk drive according to an aspect of the present invention comprises a spindle motor having a spindle shaft, on which a magnetic disk is mounted, and which has a tapped hole at one end thereof, a carriage for supporting a magnetic head for reading and writing data from and on the magnetic disk, a base for housing therein the spindle motor and the carriage, a cover mounted on the base and having a projection at an end of a tapped hole provided in a contact portion with the spindle shaft, and a screw for fixing the spindle shaft to the cover in a state where the projection of the cover is inserted so as to come in contact with an inclined portion formed above the tapped hole of the spindle shaft.

Preferably, the contact portion of the base with the spindle shaft is a recess. The projecting portion of the cover is tapered toward the spindle shaft, and the inclined portion of the tapped hole of the spindle shaft is flared toward the cover. Preferably, the respective contact portions of the cover and the spindle shaft are in close contact with each other. Preferably, an area in which the cover is pressed by the screw is approximately equal to an area of the contact portion of the spindle shaft with the cover.

A magnetic disk drive according to another aspect of the present invention comprises a spindle motor having a spindle shaft, on which a magnetic disk is mounted, and whose one end is subjected to facial roughening, a carriage for supporting a magnetic head for reading and writing data from and on the magnetic disk, a base for housing therein the spindle motor and the carriage, a cover mounted on the base, and a screw for fixing the spindle shaft to the cover in a state where the cover is placed in contact with the portion of the spindle shaft applied with the axial roughness.

The cover may be subjected to the facial roughening. Preferably, the contact portion of the base with the spindle shaft is a recess. Preferably, an area in which the cover is pressed by the screw is approximately equal to an area of the contact portion of the spindle shaft with the cover.

A magnetic disk drive according to another aspect of the present invention comprises a spindle motor having a spindle shaft, on which a magnetic disk is mounted, and which is formed with a groove at one end thereof, a carriage supporting a magnetic head for reading and writing data from and on the magnetic disk, a base for housing therein the spindle motor and the carriage, a cover mounted on the base, having a plurality of projections on a portion opposite to the groove in the spindle shaft, and a screw for fixing the spindle shaft to the cover in a state where the projections of the cover are fitted in the groove of the spindle shaft.

Preferably, the groove is annularly provided, and at least two of the projections are provided in a symmetrical position.

According to the present invention, even if the shock is applied from outside, it is possible to suppress a slide between the respective contact surfaces of the spindle shaft and the cover, thereby suppressing inclination of the spindle shaft.

DETAILED DESCRIPTION OF THE INVENTION

Figure 2:
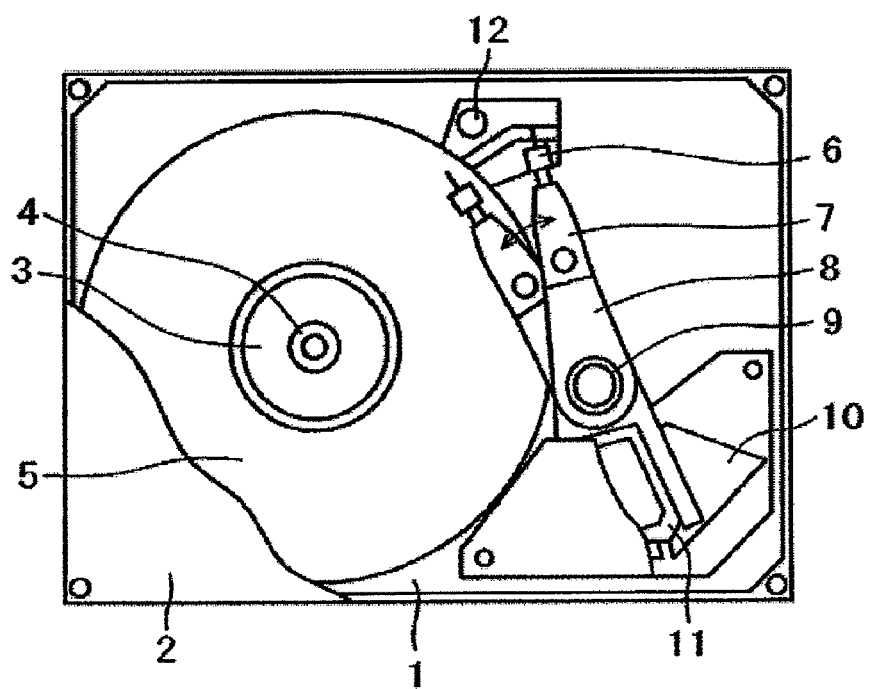
FIG. 2 is a plan view showing a schematic structure of a magnetic disk drive to which the embodiments of the present invention are applied.

FIG. 2 shows a schematic structure of a magnetic disk drive according to one embodiment of the present invention. A spindle motor 3, a pivot bearing 9, and a voice coil motor (VCM) 10 are mounted in a case formed of a base 1 and a cover 2. A magnetic disk 5 is mounted on a spindle shaft 4 of the spindle motor 3, and a head arm 8 and a coil 11 of the VCM 10 on the pivot bearing 9. A suspension 7 is attached to the head arm 8, and a magnetic head 6 is attached to the distal end of the suspension 7. Applying a current to the coil 11 of the VCM 10 causes the head arm 8 to turn about the pivot bearing 9, whereby the magnetic head 6 attached to the distal end of the suspension 7 is placed at a radial position of the magnetic disk 5 for reading and writing data therefrom and thereto. The pivot bearing 9, the head arm 8 and the VCM 10 constitute a carriage mechanism. When writing and reading are not carried out, the magnetic head 6 is unloaded onto a ramp mechanism 12.

Figure 3:
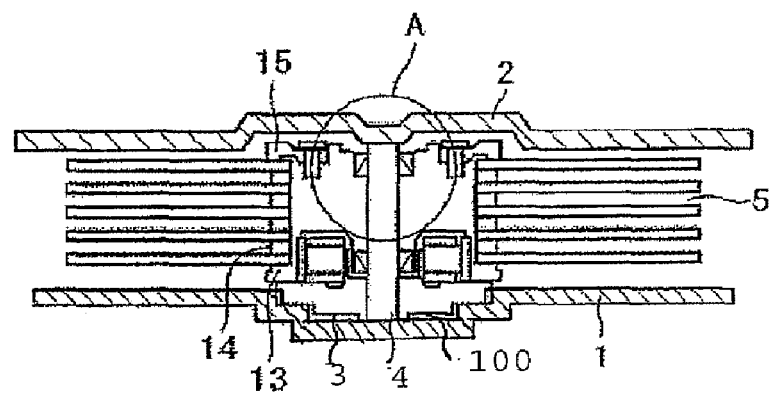
FIG. 3 is a sectional view of a fastening portion of the spindle shaft of the magnetic disk drive shown in FIG. 2.

FIG. 3 is a cross-sectional view of a state in which the spindle shaft 4 of the magnetic disk drive is fixed to recess 100 in the base 1 and the cover 2. A spindle hub 13 is provided around the spindle shaft 4, the magnetic disks 5 are mounted on the spindle hub 13 through a spacer 14 and fixed by a disk clamp 15.

Figure 1:
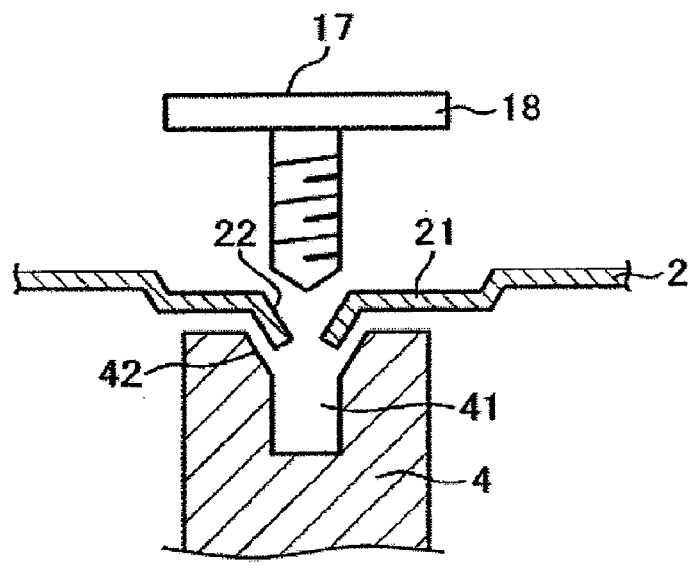
FIG. 1 is a sectional view showing a fastening construction of a spindle shaft and a cover according to a first embodiment of the present invention.

FIG. 1 is a view showing a fastening construction of the spindle shaft 4 and the cover 2 according to a first embodiment of the present invention, and shows part A in FIG. 3 enlarged. The cover 2 is formed with a recessed portion 21 at a location opposite to the spindle shaft 4. The recessed portion is formed with a projection 22 having an end to be in contact with an inclined portion 42 of a tapped hole 41 of the spindle shaft 4. Thus, a "plug-like" structure is formed. The inclined portion 42 has an upward flaring shape. A head portion 18 of a screw 17 has a diameter equal to that of the recessed portion 21 of the cover 2. An area of a portion that is pressed by the head 18 of the screw 17 when the cover is fixed with the screw 17 is equal to that of a portion of the spindle shaft 4 which corresponds to the pressed portion. Preferably, the respective contact portions of the cover 2 and the spindle shaft 4 are brought into close contact with each other, that is, a gap is not present therebetween. With the structure as described, even if the shock is applied from outside, the projecting portion 22 of the cover 2 acts as a stopper to suppress a displacement between the spindle shaft 4 and the cover 2, thereby preventing the inclination of the spindle shaft 4.

Figure 4:
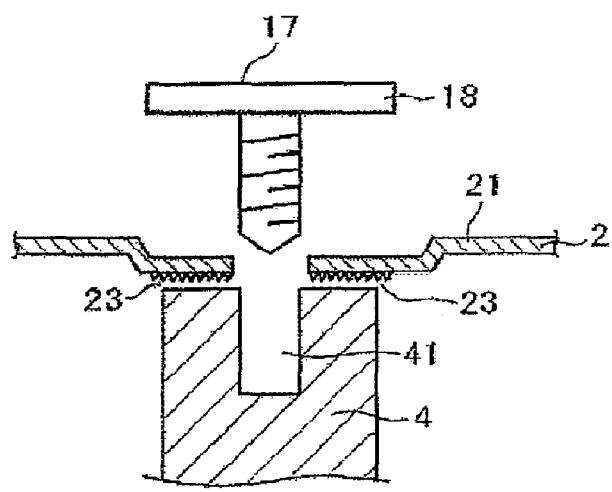
FIG. 4 is a sectional view showing a second embodiment of the present invention.

FIG. 4 shows a fastening construction according to a second embodiment of the present invention. The contact surface of a cover 2 with the spindle shaft 4 is subjected to facial-roughening 23. Also with this construction, preferably, a gap between the cover 2 and the spindle shaft 4 is not present. In this construction, when shock is applied from outside, a slide of the spindle shaft 4 is suppressed by the facial roughening 23, thereby preventing the inclination of the spindle shaft 4.

Figure 5:
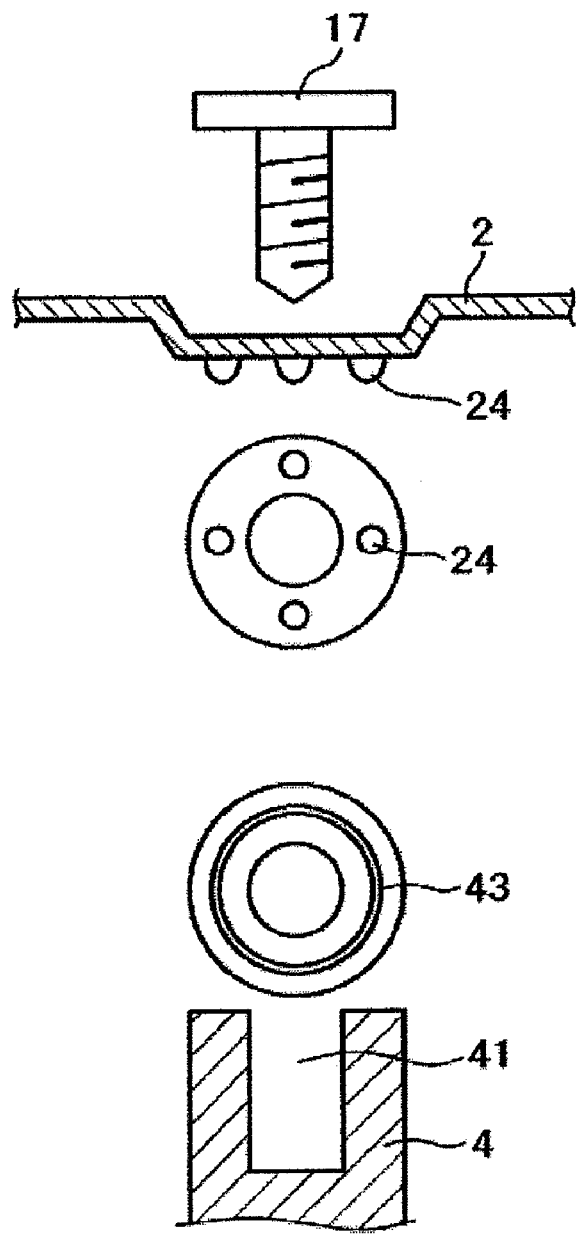
FIG. 5 is a sectional view showing a third embodiment of the present invention, also showing the structure of the contact portions of the cover and the spindle shaft.
Figure 6:
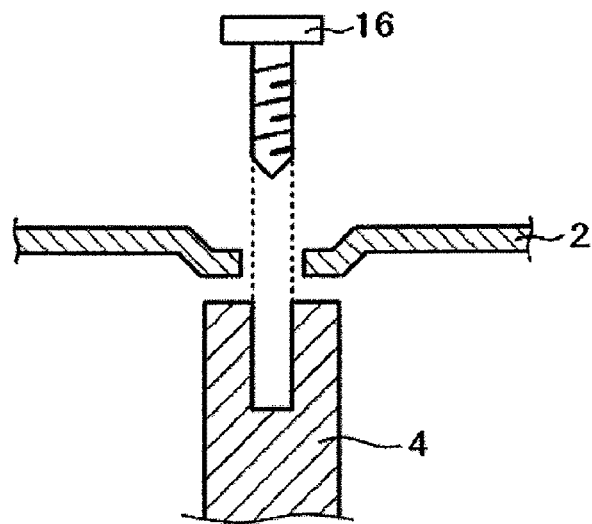
FIG. 6 is a sectional view of a conventional fastening construction of a spindle shaft and a cover.
Figure 7:
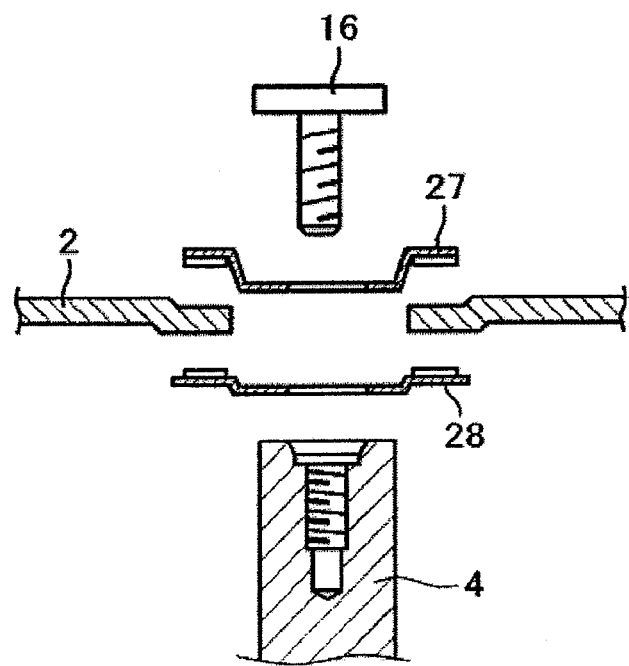
FIG. 7 is a sectional view of a conventional fastening construction of a spindle shaft and a cover.

FIG. 5 shows a fastening construction according to a third embodiment of the present invention. A cover 2 is formed with two or four symmetrical projections 24 at its contact position with a spindle shaft 4. Further, the spindle shaft 4 is formed with a groove 43 at a position corresponding to the projections 24 so that the projections 4 may be fitted into the groove 43. Preferably, the projections are formed at the positions corresponding to the shock direction. With this construction, even if the shock is applied from any direction, the projections 24 suppress a displacement between the spindle shaft 4 and the cover 2, thereby preventing the inclination of the spindle shaft 4.

According to the present invention, even if the shock is applied from outside, it is possible to suppress a slide between the respective contact surfaces of the spindle shaft and the cover, thereby suppressing inclination of the spindle shaft. Therefore, proper sequence of the magnetic disk drive can be secured to improve the performance thereof.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
   a spindle motor having a spindle shaft, on which a magnetic disk is mounted, and which is formed with a tapped hole at one end thereof;
   a carriage supporting a magnetic head for reading and writing data from and on the magnetic disk;
   a base housing therein the spindle motor and the carriage;
   a cover mounted on the base and having a projection at an end provided in a contact portion with the spindle shaft; and
   a screw which fixes the spindle shaft to the cover in a state where the projection comes into contact with an inclined portion formed on the spindle shaft above the tapped hole.

2. The magnetic disk drive according to claim 1, wherein a contact portion of the base with the spindle shaft is a recess.

3. The magnetic disk drive according to claim 1, wherein a portion of the projection is tapered toward the spindle shaft, and the inclined portion of the tapped hole of the spindle shaft is flared toward the cover.

4. The magnetic disk drive according to claim 1, wherein the projection and the spindle shaft are in close contact with each other.

5. The magnetic disk drive according to claim 4, wherein the projection and the spindle shaft are in contact with no gap between them.

6. The magnetic disk drive according to claim 1, wherein an area in which the cover is pressed by the screw is approximately equal to an area of the contact portion between the spindle shaft and the cover.

* * * * *